United States Patent Office 3,360,558
Patented Dec. 26, 1967

3,360,558
SUBSTITUTED 5α,6-ANHYDROTETRACYCLINE
METHYL BETAINES
Joseph John Hlavka, Tuxedo, and Panayota Bitha, New
York, N.Y., assignors to American Cyanamid Company,
Stamford, Conn., a corporation of Maine
No Drawing. Filed Nov. 30, 1964, Ser. No. 414,872
9 Claims. (Cl. 260—559)

ABSTRACT OF THE DISCLOSURE

This disclosure describes compounds of the class of substituted 5α,6-anhydrotetracycline methyl betaines useful as intermediates in the synthesis of physiologically active antibiotics of the tetracyline series.

This invention relates to new organic compounds and, more particularly, is concerned with novel substituted 5α,6-anhydrotetracycline methyl betaines and to methods of preparing these novel compounds. The novel 5α,6-anhydrotetracycline methyl betaines of the present invention may be represented by the following general formula:

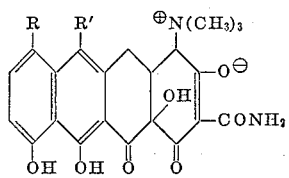

wherein R is hydrogen, chlorine or bromine and R' is hydrogen or methyl.

The novel compounds of the present invention are obtainable as crystalline materials having characteristic absorption spectra and high melting points. They are generally insoluble in water but soluble in most organic solvents.

The novel compounds of the present invention may be readily prepared by first heating an appropriate tetracycline methiodide in a 32% solution of hydrobromic acid in glacial acetic acid at steam bath temperature for a period of time of from about 5 minutes to about an hour. After the reaction is complete, the crystalline product is removed by filtration and dried. The intermediate 5α,6-anhydrotetracycline methiodide so obtained is then readily converted to the corresponding 5α,6-anhydrotetracycline methyl betaine by treatment with an aqueous solution of alkali metal hydroxide. After the reaction is complete, the crystalline product is removed by filtration and recrystallized from a lower alkanol.

The novel compounds of the present invention are useful as intermediates in the synthesis of physiologically active antibiotics of the tetracycline series. Initially, a substituted 5α,6-anhydrotetracycline methyl betaine is converted to the corresponding 1,3,4,10,11,12-hexahydroxynaphthacene-2-carboxamide by refluxing in acetonitrile under an atmosphere of nitrogen for from 5 to 10 hours. After the reaction is complete, the solvent is removed by evaporation to dryness and the product is isolated. The corresponding 1,3,4,10,11,12-hexahydroxynaphthacene-2-carboxamide may then be biologically transformed to the corresponding tetracycline as set forth in the following reaction scheme:

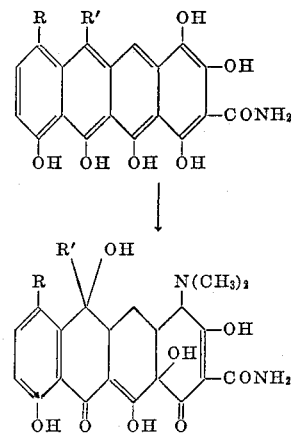

wherein R and R' are as previously defined. This transformation is accomplished by adding the 1,3,4,10,11,12-hexahydroxynaphthacene-2-carboxamide to a fermentation medium inoculated with a strain of a species of the genus Streptomyces which species is capable of producing one of the tetracyclines. Where R is hydrogen, and a non-halogenating strain of Streptomyces is employed, then R is also hydrogen in the product. Where R is hydrogen, and a 7-halogenating strain of the genus Streptomyces is employed, then R in the product is chlorine or bromine depending upon the conditions of the fermentation. Among the strains of S. aureofaciens which will introduce chlorine or bromine at the 7-position of the molecule, as well as accomplishing the 5α,6- and 4α,12α-dihydration and the introduction of the dimethylamino group at the 4-position, are the following:

S. aureofaciens

| | |
|---|---|
| ATCC 10762a | ATCC 12554 |
| ATCC 10762b | ATCC 13189 |
| ATCC 10762g | ATCC 13899 |
| ATCC 10762i | ATCC 13900 |
| ATCC 11989 | NRRL B-1286 |
| ATCC 12416b | NRRL B-1287 |
| ATCC 12416c | NRRL B-1288 |
| ATCC 12416d | NRRL B-2209 |
| ATCC 12551 | NRRL B-2406 |
| ATCC 12552 | NRRL B-2407 |
| ATCC 12553 | NRRL 3013 |

A representative strain of the genus Streptomyces which is a non-halogenating strain, that is, which will not introduce halogen in the 7-position of the molecule, but which will accomplish the 5α,6- and 4α,12α-dihydration and the introduction of the dimethylamino group at the 4-position, is S. aureofaciens NRRL 3014.

The conditions of the fermentation for the biological conversion of the 1,3,4,10,11,12-hexahydroxynaphthacene-2-carboxamides to tetracyclines are generally the same as set forth in U.S. Patent 2,482,055 to Duggar, U.S. Patent 2,734,018 to Minieri et al. and U.S. Patent 2,878,289 to McCormick et al. and which, in turn, are generally the same as for the presently known methods for producing various tetracyclines by fermentation. That is, the fermentation medium contains the usual nutrients and mineral substances. Suitable nutrients include any assimilable source of carbon, such as the polysaccharides or starches, or polyalcohols such as glycerol may be used. An assimilable source of nitrogen may be supplied through the use of proteins, protein hydrolysates, urea, corn steep liquor, meat extracts, peptone, distillers solubles, fish meal and other conventional substances. The common anions and cations are supplied in the form of their non-toxic salts. Trace elements such as manganese, cobalt, zinc, copper, etc., are obtained either as impurities in the above compounds, or through the use of tap water or by specifically adding solutions especially enriched with these trace elements.

The other general conditions of the fermentation such as hydrogen ion concentration, temperature, time, rate of aeration, preparation of the inoculum, sterilization, inoculation and the like are conventional and are similar to those for the production of other tetracyclines as set forth in the aforementioned U.S. patents to Duggar, Minieri et al. and McCormick et al.

When a 7-halogenating strain of the genus Streptomyces is employed with a 1,3,4,10,11,12-hexahydroxynaphthacene-2-carboxamide wherein R is hydrogen, it is necessary only to modify the fermentation medium so that it contains at least 10 parts per million and preferably 1000–1500 parts per million of chloride ions when the 7-chloro-substituent is desired, or a like amount of bromide ions when the 7-bromosubstituent is desired.

After the fermentation has been continued for a suitable time, for example, from 12 to 96 hours, and the transformation of the 1,3,4,10,11,12-hexahydroxynaphthacene-2-carboxamide to the desired tetracycline is substantially complete, the tetracycline product may be isolated from the fermentation mash in any convenient manner. The isolation process may be selected from any of the numerous isolation techniques now well known in the art.

The 1,3,4,10,11,12 - hexahydroxynaphthacene - 2 - carboxamide starting material may be added at any desired concentration, although for practical reasons a 1,3,4,10,11,12 - hexahydroxynaphthacene-2-carboxamide substrate at a concentration of up to about 10 grams per liter of medium is satisfactory although higher concentrations may be used with some sacrifice in yield. The addition of the 1,3,4,10,11,12-hexahydroxynaphthacene-2-carboxamide starting material may be accomplished in any suitable manner so long as it promotes contact of the 1,3,4,10,11,12-hexahydroxynaphthacene - 2 - carboxamide with the biological medium. To this end, it is preferred to add the 1,3,4,10,11,12 - hexahydroxynaphthacene - 2 - carboxamide starting material in a solvent such as dimethylformamide, dimethylacetamide, dimethylsulfoxide, tetramethylenesulfoxide and N-methylpyrrolidone. However, dimethylsulfoxide is preferred and a solution of magnesium acetate in dimethylsulfoxide is the most preferred solvent for the 1,3,4,10,11,12-hexahydroxynaphthacene-2-carboxamide starting material. Solutions of the 1,3,4,10,11,12 - hexahydroxynaphthacene-2-carboxamides must be protected from air as the compounds are readily oxidized in solution.

The invention will be described in greater detail in conjunction with the following specific examples.

EXAMPLE 1

5α,6-anhydrotetracycline methiodide

The tetracycline methiodide, 2.0 g., is dissolved in 25 ml. of glacial acetic acid by heating and 5 ml. of a 32% solution of hydrobromic acid in acetic acid is added. The solution is heated on the steam bath for 15 minutes. Heat is removed and the product is allowed to cool to room temperature for one hour. The crystalline precipitate is filtered, washed with acetic acid and ether, and dried in the vacuum desiccator to afford 1.44 g. of the product.

EXAMPLE 2

5α,6-anhydrotetracycline methyl betaine

A suspension of 1.0 g. of 5α-6-anhydrotetracycline methiodide in 50 ml. of water is prepared and the pH adjusted to 5.1 with 2 N sodium hydroxide. A thick slurry is obtained which is stirred at room temperature for one hour. It is then filtered, washed well with water and dried in vacuo to afford 700 mg. of product, and 100 mg. of this material is dissolved in 25 ml. of hot ethanol. The solution is filtered and the filtrate cooled to room temperature. The yellow precipitate is filtered, washed with ethanol and dried in vacuo at 60° C. for 4 hours. This purified product analyzed as follows:

$\lambda_{max.}^{0.1\ N\ HCl} = 272\ m\mu$ [log $\epsilon$ 4.71], 430 m$\mu$ [log $\epsilon$ 3.92]

EXAMPLE 3

6-methyl-1,3,4,10,11,12-hexahydroxynaphthacene-2-carboxamide

The 5α,6-anhydrotetracycline methyl betaine, 200 mg., is suspended in 100 ml. of spectroquality acetonitrile and nitrogen is bubbled through for 15 minutes. The suspension is then heated under nitrogen atmosphere to the boiling point of acetonitrile and the resulting solution is refluxed for 7 hours. The heat is removed and bubbling of nitrogen is continued for 15 additional minutes until all the trimethylamine vapors have been stripped off. A brown-red crystalline product precipitates out upon cooling which is filtered, washed with acetonitrile and dried in vacuo to afford 69 mg. of 6-methyl-1,3,4,10,11,12-hexahydroxynaphthacene-2-carboxamide.

EXAMPLE 4

Biological conversion of 1,3,4,10,11,12-hexahydroxynaphthacene - 2 - carboxamide to 7-chloro-6-demethyltetracycline Spores of S. aureofaciens NRRL 3013 were washed from an agar slant with sterile distilled water to form a suspension containing 60–80×10⁶ spores per ml. A 0.33 ml. portion of this suspension was used to inoculate an 8-inch test tube containing 8 ml. of a medium prepared according to the following formulation:

| | | |
|---|---|---|
| Sucrose | grams | 30 |
| Ammonium sulfate | do | 2 |
| Calcium carbonate | do | 7 |
| Cornsteep liquor | do | 20 |
| Tap water, q.s. to | ml | 1000 |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute, whereby an inoculum of the S. aureofaciens was obtained. A fermentation medium of the following composition was prepared:

| | | |
|---|---|---|
| $(NH_4)_2SO_4$ | grams | 6.7 |
| $CaCO_3$ | do | 9.0 |
| $CoCl_2 \cdot 6H_2O$ | mg | 5.0 |
| $NH_4Cl$ | grams | 2.0 |
| $MnSO_4$ (70% technical grade) | do | 0.10 |
| Cornsteep liquor | do | 25.0 |
| Starch | do | 52.5 |
| Corn flour | do | 14.5 |
| Tap water, q.s. to | ml | 1000 |

After sterilization of this medium in an autoclave for 20 minutes at a pressure of 15 pounds per square inch, a 25 ml. portion in a 250 ml. Erlenmeyer flask was inoculated with a 1.0 ml. portion of the S. aureofaciens inoculum. The fermentation was carried out at 25° C. for 24 hours on a rotary shaker operating at 180 revolutions per minute. At this time a partially fermented mash of S. aureofaciens NRRL 3013 was transferred to an individual flask containing a solution of 5.45 mg. of 1,3,4,10,11,12-hexahydroxynaphthacene - 2 - carboxamide in 30 mg. of magnesium acetate and 1 ml. of dimethylsulfoxide. The fermentation was then continued on the rotary shaker for an additional 72 hours at 28° C. At this time, analysis of the mash showed the presence of 17 micrograms per ml. of 7-chloro-6-demethyltetracycline. A control flask run in exactly the same manner but omitting the 1,3,4,10,11,12-hexahydroxynaphthacene-2-carboxamide showed no 7-chloro-6-demethyltetracycline.

EXAMPLE 5

*Biological conversion of 6 - methyl - 1,3,4,10,11,12 - hexahydroxynaphthacene - 2 - carboxamide to 7 - chlorotetracycline*

Spores of *S. aureofaciens* NRRL 3013 were washed from an agar slant with sterile distilled water to form a suspension containing 60–80×10$^6$ spores per ml. A 0.33 ml. portion of this suspension was used to inoculate an 8 inch test tube containing 8 ml. of an inoculum medium prepared according to the following formulation:

| | | |
|---|---|---|
| Sucrose | grams | 30 |
| Ammonium sulfate | do | 2 |
| Calcium carbonate | do | 7 |
| Cornsteep liquor | do | 20 |
| Tap water, q.s. to | ml | 1000 |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute whereby an inoculum of *S. aureofaciens* was obtained. A fermentation medium of the following composition was prepared:

| | | |
|---|---|---|
| $(NH_4)_2SO_4$ | grams | 6.7 |
| $CaCO_3$ | do | 9.0 |
| $CoCl_2 \cdot 6H_2O$ | mg | 5.0 |
| $NH_4Cl$ | grams | 2.0 |
| $MnSO_4$ (70% technical grade) | do | 0.10 |
| Cornsteep liquor | do | 25.0 |
| Starch | do | 52.5 |
| Corn flour | do | 14.5 |
| Tap water, q.s. to | ml | 1000 |

After sterilization of this medium, 25 ml. portions in 250 ml. Erlenmeyer flasks were inoculated with 1.0 ml. portions of the *S. aureofaciens* NRRL 3013 inoculum. The fermentation was carried out at 28° C. for 24 hours on a rotary shaker operating at 180 revolutions per minute. At this time each mash portion was transferred to an individual flask containing a solution of 10.7 mg. of 6-methyl - 1,3,4,10,11,12 - hexahydroxynaphthacene - 2-carboxamide in a mixture of 30 mg. of magnesium acetate and 1 ml. of dimethylsulfoxide. The fermentation was continued on the rotary shaker for an additional 96 hours at 28° C. At this time, biological assays of the mash indicated the presence of antibacterial activity corresponding to 264 micrograms of 7-chlorotetracycline per ml. This corresponds to a yield of 49% based on the compound added. The identity of the product as 7-chlorotetracycline was confirmed by paper chromatography in a butanol-pH3 phosphate buffer system. A control flask run in exactly the same manner but with the addition of only 30 mg. of magnesium acetate and 1 ml. of dimethylsulfoxide and no 6 - methyl - 1,3,4,10,11,12 - hexahydroxynaphthacene-2-carboxamide, showed no 7-chlorotetracycline.

EXAMPLE 6

*Biological conversion of 7-chloro-6-methyl-1,3,4,10,11,12-hexahydroxynaphthacene-2-carboxamide to 7-chlorotetracycline utilizing a non-chlorinating strain of S. aureofaciens*

Spores of non-chlorinating *S. aureofaciens* NRRL 3014 were washed from an agar slant with sterile distilled water to form a suspension containing 60–80×10$^6$ spores per ml. A 0.33 ml. portion of this suspension was used to inoculate an 8 inch test tube containing 8 ml. of a medium prepared according to the following formulation:

| | | |
|---|---|---|
| Sucrose | grams | 30 |
| Ammonium sulfate | do | 2 |
| Calcium carbonate | do | 7 |
| Cornsteep liquor | do | 20 |
| Tap water, q.s. to | ml | 1000 |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute, whereby an inoculum of the *S. aureofaciens* was obtained. A fermentation medium of the following composition was prepared:

| | | |
|---|---|---|
| $(NH_4)_2SO_4$ | grams | 6.7 |
| $CaCO_3$ | do | 9.0 |
| $CoCl_2 \cdot 6H_2O$ | mg | 5.0 |
| $NH_4Cl$ | grams | 2.0 |
| $MnSO_4$ (70% technical grade) | do | 0.10 |
| Cornsteep liquor | do | 25.0 |
| Starch | do | 52.5 |
| Corn flour | do | 14.5 |
| Tap water, p.s. to | ml | 1000 |

After sterilization of this medium in an autoclave for 20 minutes at a pressure of 15 pounds per square inch, 25 ml. portions in 250 ml. Erlenmeyer flasks were inoculated with 1.0 ml. portions of the *S. aureofaciens* inoculum. The fermentation was carried out at 25° C. for 24 hours on a rotary shaker operating at 180 revolutions per minute. At this time each mash portion was transferred to an individual flask containing a solution of 10 mg. of 7-chloro - 6 - methyl-1,3,4,10,11,12-hexahydroxynaphthacene 2-carboxamide in a mixture of 10 mg. of magnesium acetate and 1 ml. of dimethyl-sulfoxide. The fermentation was then continued on the rotary shaker for an additional 96 hours at 28° C. At this time analysis of the mash showed the presence of 10 micrograms per ml. of 7-chlorotetracycline. A control flask run in exactly the same manner but omitting the 7-chloro-6-methyl-1,3,4,10,11,12-hexahydroxynaphthacene-2-carboxamide showed no 7-chlorotetracycline.

EXAMPLE 7

*Biological conversion of 7-chloro-1,3,4,10,11,12-hexahydroxynaphthacene-2-carboxamide to 7-chloro-6-demethyltetracycline utilizing a non-chlorinating strain of S. aureofaciens*

The procedure of Example 6 was followed with these exceptions: The partially fermented (24-hour) mash was transferred to flasks containing a solution of 10 mg. of 7 - chloro-1,3,4,10,11,12-hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time, analysis of the mash showed the presence of 9 micrograms per ml. of 7-chloro-6-demethyltetracycline. A control flask run in exactly the same manner but omitting the 7-chloro-1,3,4,10,11,12-hexahydroxynaphthacene-2-carboxamide showed no 7-chloro-6-demethyltetracycline.

EXAMPLE 8

*Biological conversion of 7-chloro-6-methyl-1,3,4,10,11,12-hexahydroxynaphthacene-2-carboxamide to 7-chlorotetracycline utilizing a chlorinating strain of S. aureofaciens*

The procedure of Example 6 was followed with these exceptions: Spores of chlorinating *S. aureofaciens* NRRL 3013 were washed from an agar slant with sterile distilled water to form a suspension containing 60–80×10$^6$ spores per ml. A 0.33 ml. portion of this suspension was used to inoculate an 8 inch test tube containing 8 ml. of the medium described in Example 6. The partially fermented (24 hour) mash (prepared as in Example 6) was transferred to flasks containing a solution of 10 mg. of 7- chloro - 6 - methyl-1,3,4,10,11,12-hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time, analysis of the mash showed the presence of 10 micrograms per ml. of 7-chlorotetracycline. A control flask run in exactly the same manner but omitting the 7-chloro-6-methyl-1,3,4,10,11,12-hexahydroxynaphthacene-2-carboxamide showed no 7-chlorotetracycline.

EXAMPLE 9

*Biological conversion of 7-chloro-1,3,4,10,11,12-hexahydroxynaphthacene-2-carboxamide to 7-chloro-6-demethyltetracycline utilizing a chlorinating strain of S. aureofaciens*

The procedure of Example 8 was followed with these exceptions: The partially fermented (24-hour) mash was transferred to flasks containing a solution of 10 mg. of 7 - chloro-1,3,4,10,11,12-hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time analysis of the mash showed the presence of 9 micrograms per ml. of 7- chloro-6-demethyltetracycline. A control flask run in exactly the same manner but omitting the 7-chloro-1,3,4,10,11,12-hexahydroxynaphthacene-2-carboxamide showed no 7-chloro-6-dimethyltetracycline.

We claim:
1. A compound of the formula:

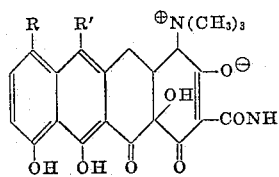

wherein R is selected from the group consisting of hydrogen, chlorine and bromine and R' is selected from the group consisting of hydrogen and methyl.
2. 5α,6-anhydrotetracycline methyl betaine.
3. 7-chloro-5α,6-anhydrotetracycline methyl betaine.
4. 7-bromo-5α,6-anhydrotetracycline methyl betaine.
5. 6-demethyl-5α,6-anhydrotetracycline methyl betaine.
6. 7-chloro-6-demethyl-5α,6-anhydrotetracycline methyl betaine.
7. 7-bromo-6-demethyl-5α,6-anhydrotetracycline methyl betaine.

8. The process of preparing compounds of the formula:

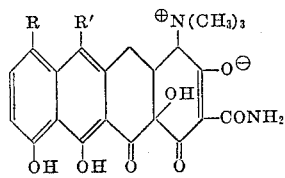

wherein R is selected from the group consisting of hydrogen, chlorine and bromine and R' is selected from the group consisting of hydrogen and methyl, which comprises dissolving a compound of the formula:

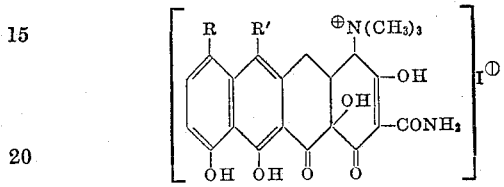

wherein R and R' are as hereinabove defined, in aqueous alkali metal hydroxide at about room temperature.

9. The process of preparing compounds of the formula:

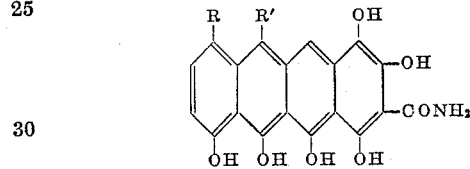

wherein R is selected from the group consisting of hydrogen, chlorine and bromine and R' is selected from the group consisting of hydrogen and methyl, which comprises refluxing a compound of the formula:

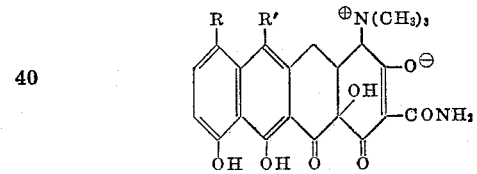

wherein R and R' are as hereinabove defined, in acetonitrile under an inert atmosphere.

References Cited
FOREIGN PATENTS
1,156,405 10/1963 Germany.

NICHOLAS S. RIZZO, *Primary Examiner.*